UNITED STATES PATENT OFFICE.

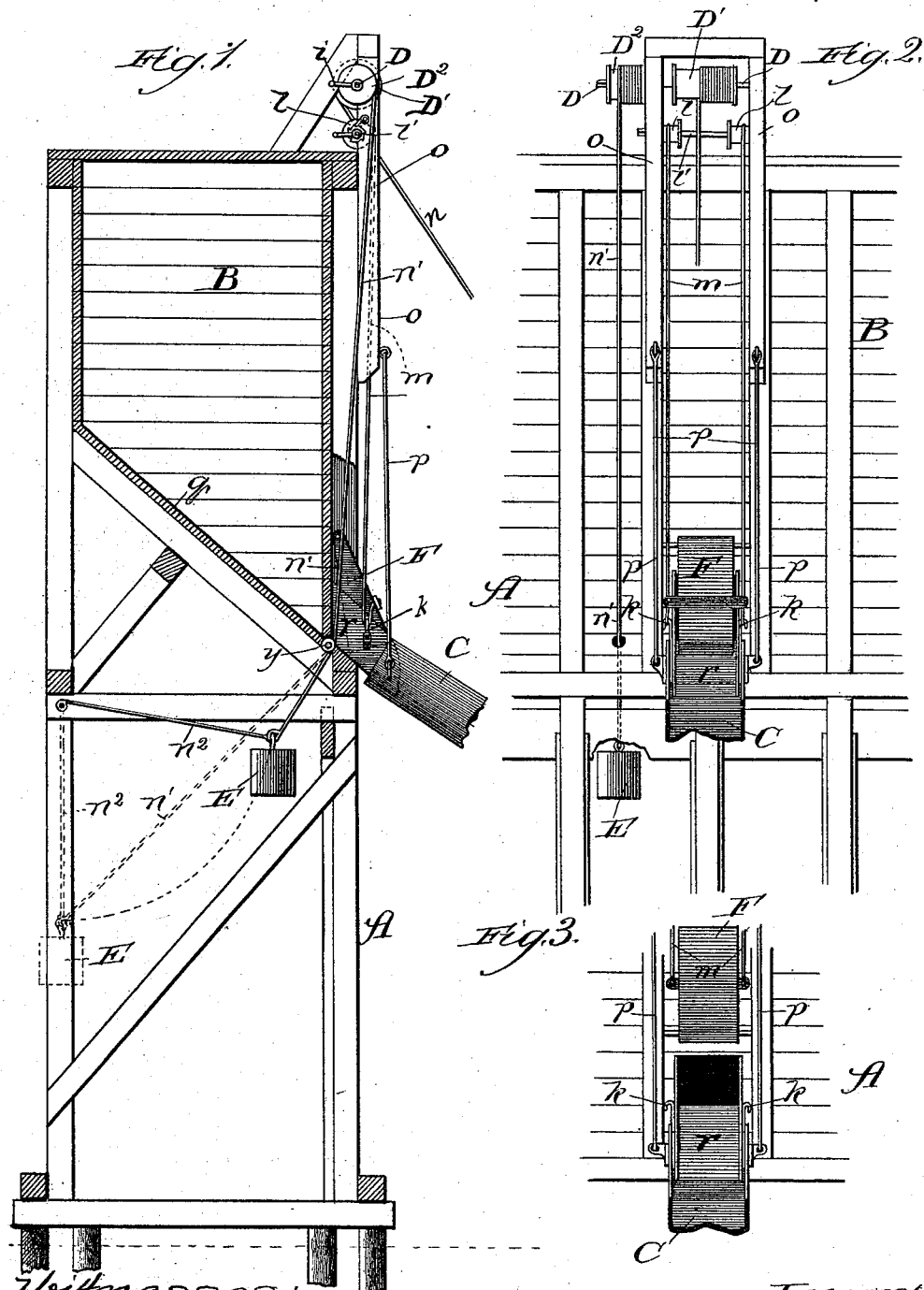

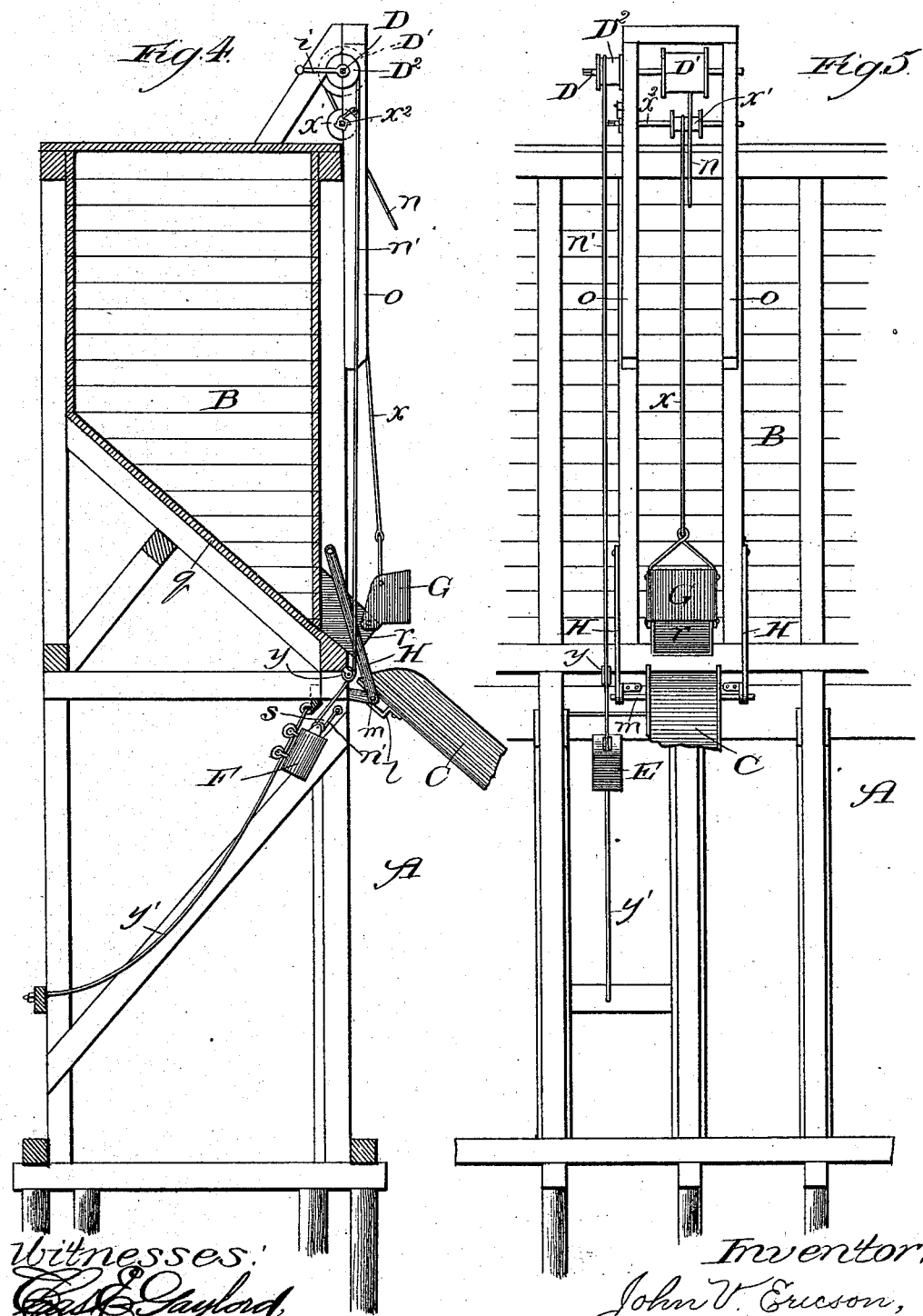

JOHN V. ERICSON, OF ESCANABA, MICHIGAN, ASSIGNOR TO THE PETTIBONE, MULLIKEN & COMPANY, OF CHICAGO, ILLINOIS.

DISCHARGE APPARATUS FOR COAL OR ORE BINS.

SPECIFICATION forming part of Letters Patent No. 412,374, dated October 8, 1889.

Application filed May 21, 1889. Serial No. 311,607. (No model.)

*To all whom it may concern:*

Be it known that I, JOHN V. ERICSON, a citizen of the United States, residing at Escanaba, in the county of Delta and State of Michigan, have invented a new and useful Improvement in Discharge Apparatus for Coal or Ore Bins, of which the following is a specification.

My invention relates to an improvement in the class of apparatus in use, particularly on docks, for the transfer from the latter to vessels of coal and ore; and it relates more especially to an improvement in that form of the apparatus in which the chute for directing the discharge from the bin, and which is a very heavy object, is movable on its base portion to be raised out of the way when not in use and lowered into operative position, and which is counterbalanced in a manner to cause the counterbalancing medium to increase and decrease in resistance as the resistance of the chute increases and decreases, whereby the chute is balanced in every position it assumes in being raised and lowered, thus requiring to move it merely that its inertia and the friction of parts be overcome.

The objects of my improvement are to provide a simple and yet effective construction of counterbalancing mechanism, to support the chute in a manner that shall permit it to have lateral as well as the raising and lowering or vertical movement, to provide means of simple construction and readily and effectively operative for controlling the flow of material from the bin, and to provide a discharge apparatus of the class referred to of generally improved construction.

My invention consists in the general construction of my improved apparatus; and it also consists in details of construction and combinations of parts.

In the accompanying drawings, Figure 1 represents a cross-section of an ore-dock having the bin it supports provided with my improved discharge apparatus, shown as partly broken away. Fig. 2 is a broken front elevation of the same; Fig. 3, a similar view showing the detail for controlling the discharge from the bin raised out of operative position; and Figs. 4 and 5 are views corresponding, respectively, with Figs. 1 and 2, but showing modifications as to the manner of supporting the counterbalancing-weight and the chute.

A is a dock supporting a bin B, both of common or suitable construction. From the discharge-opening of the bin there should extend a permanent or rigidly-secured short spout $r$, inclining in the direction of incline of the bottom $q$ of the bin.

C is the chute, flexibly supported, as shown in Figs. 1 and 2, by hanger-rods $p$, cables, chains, or the like, secured at one end and to the frame-work $o$, provided on the front side of the bin, and at their opposite ends to opposite sides of the chute near its base, which extends under the spout $r$. The chute may also be supported, as shown in Figs. 4 and 5, on the horizontal bar $m$, sustained by brackets H, secured to the bin, and around which cross-bar extend straps $l$, secured near the base and toward opposite sides of the bottom of the chute, the space inside each strap being considerably wider than the diameter of the cross-bar, whereby the chute may be moved laterally, and where the bracket-support is employed for the chute a bridge G should be provided to span the space between the spout $r$ and chute C, the bridge being pivoted near its upper rear edge to the corresponding forward edge of the spout $r$, and connected by a cable $x$ with a drum $x'$ on a shaft $x^2$, supported in the frame $o$, and which shaft may be controlled against backward rotation by ordinary dog mechanism, as shown.

D is a rotary shaft journaled in and extending beyond one side of the frame $o$, and carrying inside the frame a drum D' and on its projecting end a smaller drum $D^2$, the drum D' being connected with the chute C near its free end and in a usual manner by a cable or chain $n$.

E is a weight sufficiently heavy to counterbalance or about counterbalance the chute C when suspended on a cable $n'$, secured at opposite ends, respectively, to the drum $D^2$, and a rod $n^2$, pivoted to a stationary object—such as the dock—and below the drum, as shown in Fig. 1, the cable passing over a suitable guide-pulley $y$ and the rod $n^2$ forming practically a part of the cable. The cable $n'$ $n^2$, which should wind on the drum $D^2$ in the direction contrary to the winding of the cable $n$ on the drum D, extends, as shown in Fig. 1, directly from its upper fastened end to the point of its attachment toward the rear of the dock, and is of such a length as to cause it to raise the weight to about the position shown in Fig. 1, when the chute is lowered to its lowest position, and to cause the weight to hang perpendicularly, as shown by dotted lines in Fig. 1, when the chute is raised to its highest position. As illustrated in Fig. 4, the weight moves on an inclined slack guide-cable $y'$, the cable $n'$ being fastened at its lower end near the front side of the dock, and the weight being suspended from a loop $s$ in the cable.

F is a door (shown only in connection with the construction represented in Figs. 1 and 2, though also applicable to that illustrated in Figs. 4 and 5) hinged at its upper end to the upper edge of the discharge-opening in the bin, and connected from its opposite sides, near the free end, by cables $m$ with drums $l$ on a shaft $l'$, journaled in the frame $o$, and for a purpose hereinafter described hooks $k$ or analogous devices are provided on opposite sides of the stationary spout $r$.

The operation is as follows: Turning the shaft D at a crank $i$ to wind the cable $n$ on the drum D' raises the chute C, and at the same time unwinds the cable $n'$ from the drum $D^2$, allowing the weight E, with the construction shown in Fig. 1, to move in the arc of a circle toward a vertically-hanging position from the point at which the lower end of its suspension cable or rod is secured, or, as shown in Fig. 4, toward the lower end of the slack inclined guide-cable, the pitch of which is so steep as not to detract from the increase or decrease in the resistance of the weight in moving toward either of its extreme positions, while to lower the chute the shaft D is turned in the opposite direction, with the consequent effect on the weight to raise it toward the position illustrated.

The attachment of the chute adjacent to the bin-opening in a manner to permit it to be moved to a desired extent in a lateral direction on its base or inner end affords the advantage of enabling it to be directed readily to different hatches of a vessel or to different angles in the same hatch, and obviates the danger to which it would be liable if rigid of its being injured by collision with it of a vessel, or by movement of the latter while the chute was extending into its hatch.

The pivotal bridge G is required, of course, only where there is an opening between the spout $r$ and adjacent end of the chute.

To stop or control the flow of material from the bin, the door F is lowered on its hinges by unwinding the cables $m$, when the latter are passed under the hooks $k$ and the shaft $l'$ turned to wind up the cables, thereby tightening the door down sufficiently to stop the flow entirely or to lessen it, as desired, according to the winding, the shaft being held against backward rotation by a dog, as shown in Fig. 1.

While I have described my improvement for use in connection with coal and ore bins, I do not limit its application to that purpose, as it may also be used with other material in the bin than coal and ore. Nor do I limit my improvement to the exact details shown and described, since these may be variously changed by those skilled in the art to which it relates without departing from the spirit of my invention.

What I claim as new, and desire to secure by Letters Patent, is—

1. In a discharge apparatus for coal and ore bins, the combination, with the chute C, pivotally supported at its inner end, crank-shaft D, supported above the pivoted end of the chute and carrying the drum D', and cable $n$, connecting the chute from toward its free end with the drum D', of the auxiliary drum $D^2$ upon the crank-shaft D, weight E behind the pivoted end of the chute, a support for the weight guiding it in a defined arc during its rise and fall, and cable $n'$, connecting the drum $D^2$ with the weight E and winding upon its drum in a direction contrary to that of the cable $n$, substantially as described.

2. In a discharge apparatus for coal and ore bins, the combination, with the chute C, pivotally supported at its inner end, crank-shaft D, supported above the pivoted end of the chute and carrying the drum D', and cable $n$, connecting the chute from toward its free end with the drum D', of the auxiliary drum $D^2$ upon the crank-shaft D, weight E, pendulously supported behind the pivoted end of the chute, and cable $n'$, connecting the drum $D^2$ with the weight E and winding upon its drum in a direction contrary to that of the cable $n$, substantially as described.

3. In a discharge apparatus for coal and ore bins, the combination, with the bin B, of a counterbalanced chute C, pivotally supported near its inner end on a horizontal bar $m$, to permit of its movement through a vertical arc, and movable on the said bar laterally through an arc, a pivotal bridge G, and means for raising and lowering the bridge, substantially as described.

4. In a discharge apparatus for coal and ore bins, the combination, with the bin B, having a discharge-opening, and a chute C, pivotally supported at the said opening, of a door F, hinged at the discharge-opening, a rotary shaft $l'$, supported on the bin and connected from near its free end with the door, and a hook $k$, secured to a stationary support, around which to pass the connecting medium between the door and shaft, substantially as and for the purpose set forth.

JOHN V. ERICSON.

In presence of—
J. W. DYRENFORTH,
M J. BOWERS.